Figure 1A:
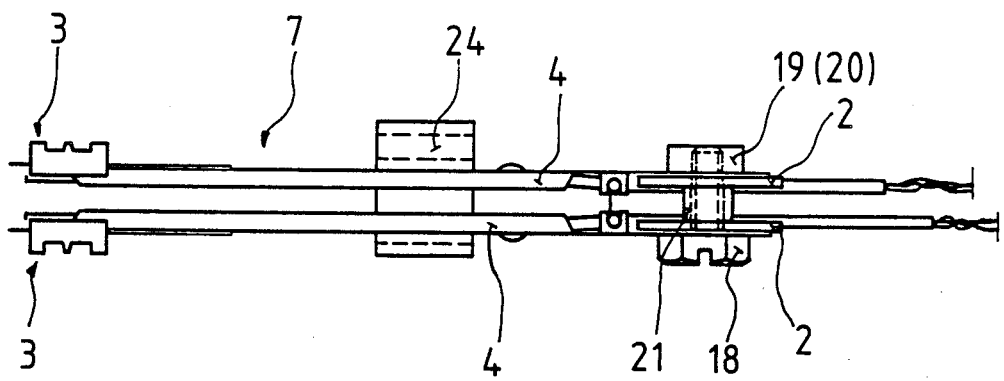

United States Patent [19]

Manzke et al.

[11] Patent Number: 4,739,430

[45] Date of Patent: Apr. 19, 1988

[54] APPARATUS FOR POSITIONING A PLURALITY OF MAGNETIC HEADS OVER PRESELECTED TRACKS OF AT LEAST TWO RECORDING DISKS

[75] Inventors: Klaus Manzke, Westheim; Peter Hammerschmitt, Bruehl; Hans-Joachim Weis, Ludwigshafen, all of Fed. Rep. of Germany

[73] Assignee: BASF Aktiengesellschaft, Ludwigshafen, Fed. Rep. of Germany

[21] Appl. No.: 883,632

[22] Filed: Jul. 9, 1986

[30] Foreign Application Priority Data

Jul. 10, 1985 [DE] Fed. Rep. of Germany ... 8519878[U]

[51] Int. Cl.⁴ .............................................. G11B 5/55
[52] U.S. Cl. ...................................... 360/106; 360/104
[58] Field of Search ........................... 360/98, 106, 104

[56] References Cited

U.S. PATENT DOCUMENTS

D. 251,559  4/1979  Kilmer et al. .......................... 14/40
3,922,720  11/1975  Caletti ................................. 360/106
4,196,456   4/1980  Manzke ............................... 360/106
4,544,973  10/1985  DeBult ................................ 360/106

FOREIGN PATENT DOCUMENTS 0087300  8/1983  European Pat. Off. .

Primary Examiner—A. J. Heinz
Attorney, Agent, or Firm—Keil & Weinkauf

[57] ABSTRACT

The invention relates to an apparatus for positioning a plurality of scanning devices, in particular magnetic heads, over preselected tracks on a stack of at least two rotatable recording disks in a memory processing unit, in which apparatus the single-beam section of the supporting arm of the magnetic heads has been produced integral with the head tower and is provided with mounting means for at least one magnetic head on a spring-supporting means, in particular for a pair of magnetic heads previously connected to one another, so that it is possible to replace any head or pair of heads. The apparatus can be used in magnetic storage systems, industrial production equipment etc.

5 Claims, 4 Drawing Sheets

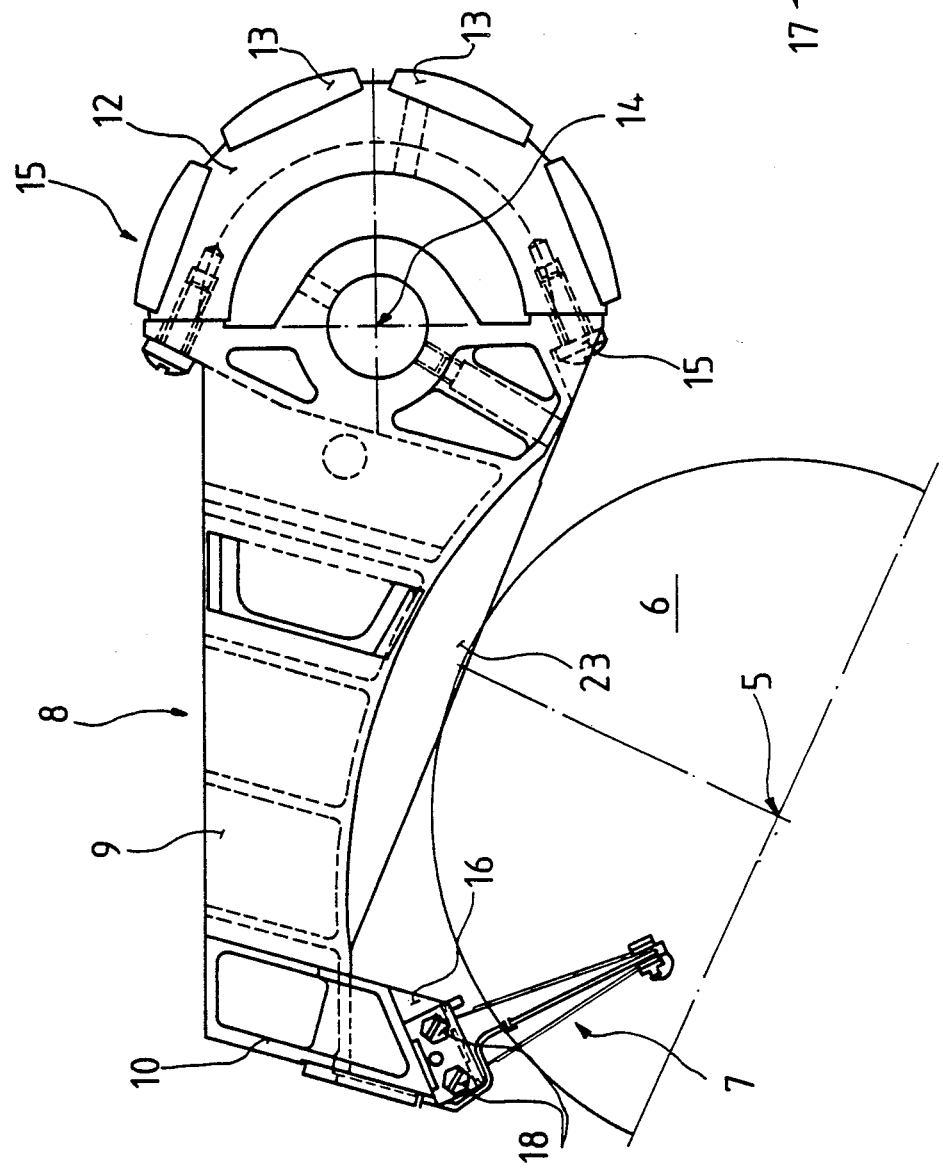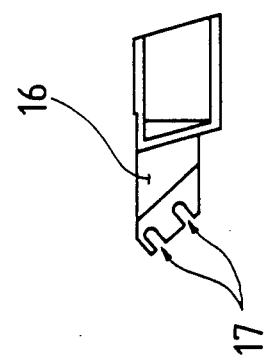

APPARATUS FOR POSITIONING A PLURALITY OF MAGNETIC HEADS OVER PRESELECTED TRACKS OF AT LEAST TWO RECORDING DISKS

The present invention relates to an apparatus for positioning a plurality of scanning devices over preselected tracks on a stack of at least two rotatable recording disks in a memory processing unit, said apparatus comprising a single cantilevered pivoting assembly common to said plurality of scanning devices and including a tower mounting said plurality of scanning devices, each of said scanning devices being provided at the end of a support spring and said spring supporting a flange-plate, and a support arm having a single beam section which at its free end carries said tower and which at its other end, in turn, is carried by a drive section having a rotor element mounted for pivotal movement about an axis parallel to the rotational axis of said disks and located outside the periphery of said disks, and said apparatus also comprising a stator element, said rotor element and said stator element together forming a drive motor for pivoting said assembly. The present invention furthermore relates to a memory processing unit having at least one such apparatus.

German Utility Model No. 8,315,150 describes an apparatus of this type for magnetic heads, in which the heads are fastened to a head tower via replaceable head supports, and the entire head tower can be fastened by means of screws to the essentially single arm section of the swinging arm and can be detached from this, and is therefore replaceable. The head supports of these known heads consist of a support spring which supports the head at one end and a flange-plate at the other, the said flange-plate being attached to the head tower only indirectly via a special fastening part.

German Utility Model No. 8,215,55 discloses heads on support springs which are fastened via flange-plates to separate head arm parts, the latter forming the head tower when joined together. In this construction, it is not possible to fasten or detach each head individually, this being prevented by the series arrangement of the heads which arises from the assembly sequence.

U.S. Pat. No. Des. 251,559 discloses a separate head tower which s clamped between the halves of a head support and fastened by means of special fastening elements. Although the heads can be fastened and detached by inserting them into openings in the head tower, special fastening elements whose shape is matched up with the openings are required and, because of the mode of assembly, fastening and detaching can only be carried out serially.

In the above conventional head support embodiments, additional fastening elements result in an increase in mass and consequently in an unfavorable moment of inertia.

European Patent No. 87,300 discloses a head support arm having an integrated head tower, where a rectangular opening possessing lateral step-like sections (meander form lines of the longitudinal sides of the openings) serves to hold the individual heads. An additional fastening element for adjusting the head position is required for each head, and screw connections are necessary to ensure vibration-free fastening. The whole configuration and drive system of this positioning device is quite different from that of the invention.

It is an object of the present invention to improve the production, assembly and functioning of the positioning apparatus of the type defined at the outset, and to provide a memory processing unit having at least one such apparatus.

We have found that this object is achieved as described in claim 1.

A particular advantage of the novel embodiment is that the support arm can be produced in a simple manner without separate head tower, resulting in a particularly advantageous vibrational frequency for the positioning speed.

In another embodiment for positioning at least two scanning devices, their flange-plates are connected to one another by means of screws and are a distance apart, the spacing and width of the receiving slots corresponding to the spacing and diameter of the screws for fastening the two scanning devices together. Thus, simple and secure alignment and fastening of a pair of scanning devices is achieved. In a practical embodiment, the receiving slots are advantageously arranged axially above the other. This also permits mounting to be effected by means of a tool axially through the slots.

In another advantageous embodiment, elastically deformable sleeves are provided over the screws, for spacing two scanning devices arranged axially one above the other. As a result, the devices can be positioned a predeterminable distance apart prior to installation, on the one hand, and on the other hand a definite predeterminable minimum distance under spring action can be achieved after installation, which is very advantageous with regard to possible damage and because installation and dismantling can be carried out in a simple manner.

In practice, these sleeves can consist of plastic, in particular nylon, e.g. an Ultamid ®, so that they are economical to produce. Instead of the nuts, a common threaded plate can advantageously form the counter piece for the fastening screws, once again permitting savings to be made in production and assembly.

®Registered Trademark of BASF Aktiengesellschaft, Ludwigshafen

The positioning apparatus is very advantageously used in conjunction with one or more magnetic or capacitive heads to be positioned over tracks on disks in a memory processing unit, in which one pivoting arm which can be rotated about an axis parallel to the disk axis and relative to the disk and are intended for the head, and a drive motor for the pivoting support arm, are provided. Preferably, the heads are in the form of units comprising a pair of heads one above the other and connected to one another, and are mounted in this way very easily.

Figure 1B:
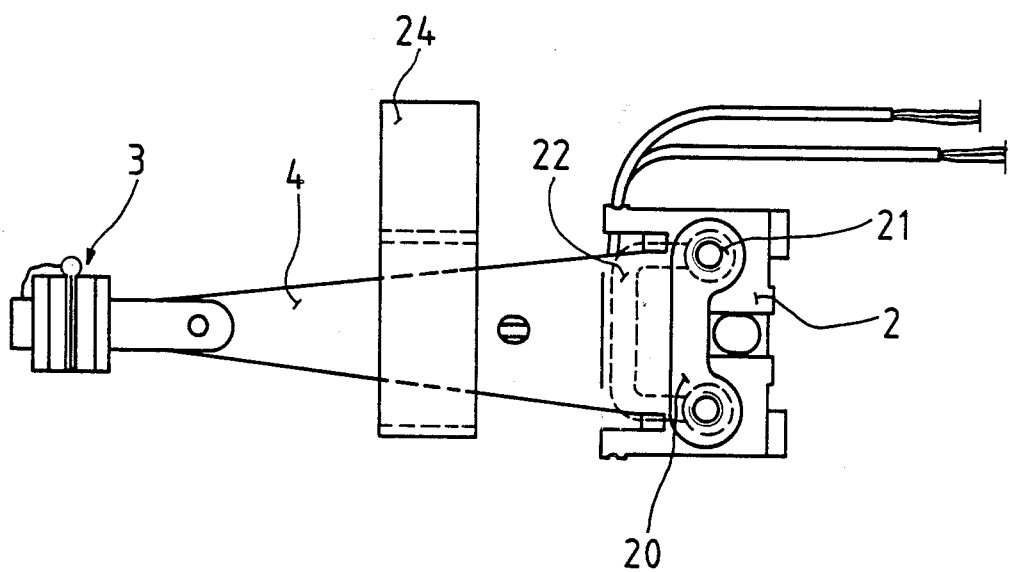
Figure 2A:
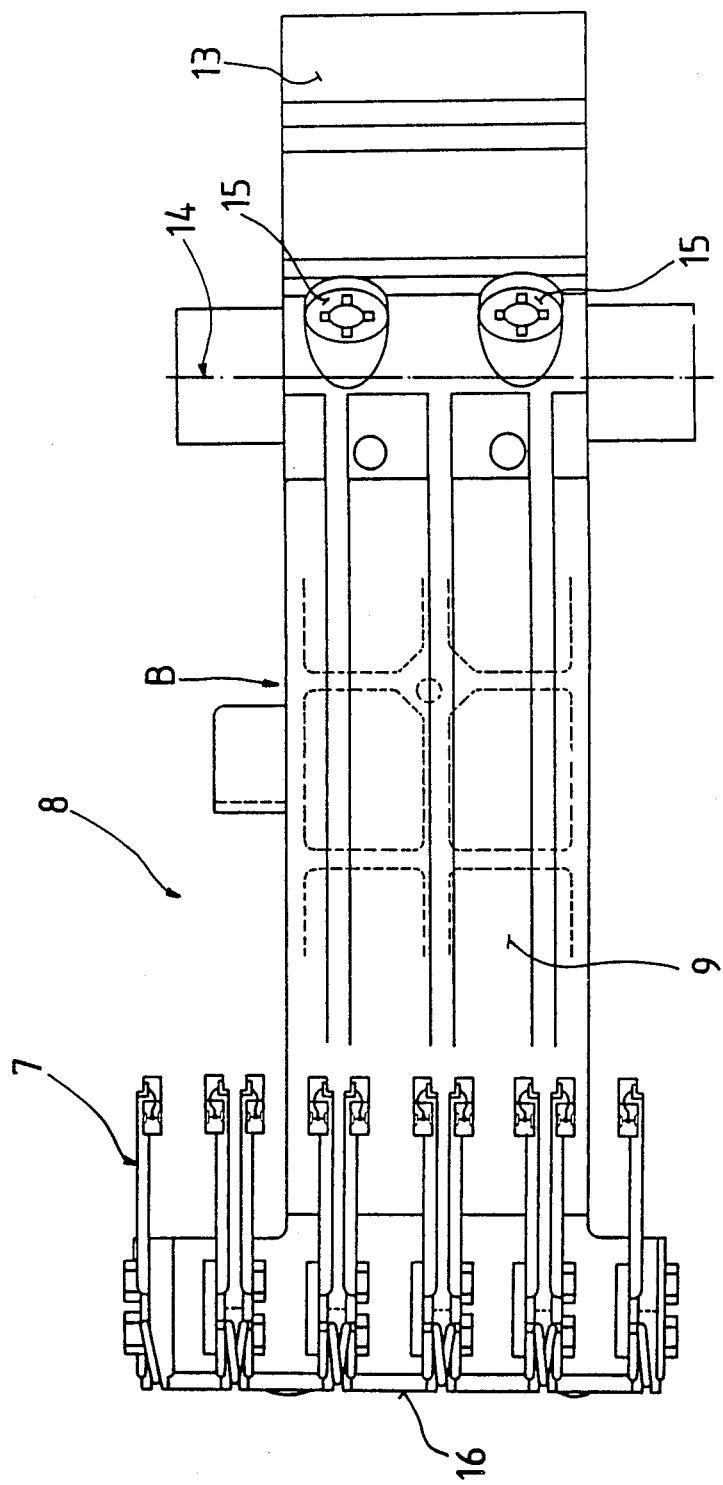
Figure 3:
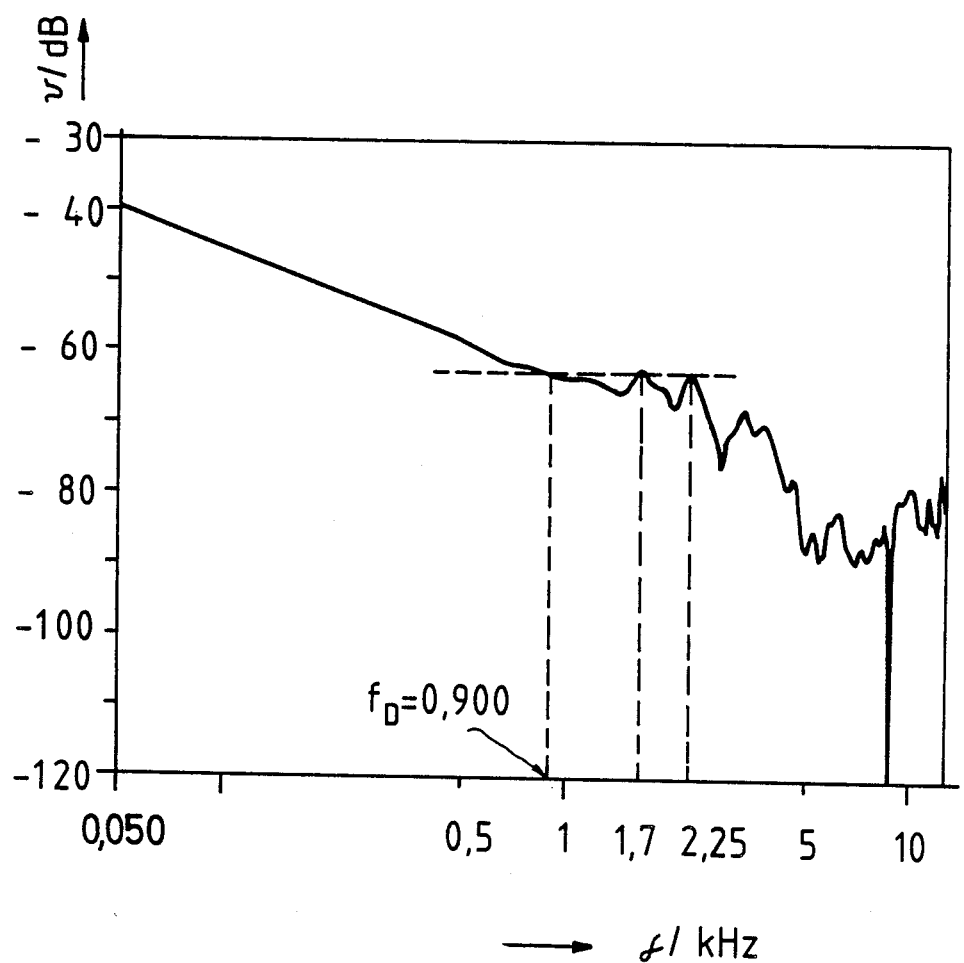

Details of the apparatus are disclosed in the following embodiments given by way of example and illustrated in the drawings, in which FIGS. 1A and 1B show a side view and plan view of a pair of magnetic transducer heads arranged axially one above the other and connected in the form of an easily mountable unit, FIGS. 2A to 2C show a side view, plan view and detailed view of a head tower unit and support arm unit with heads, and FIG. 3 shows a graph of the head arm positioning speed plotted against the frequency.

A pivoting positioner in a disk memory comprises a pivoting support arm 8 which essentially consists of a single beam section 9 but also includes an integrated head tower 10, which may furthermore be produced integral with the said single beam section. Beam section 9 and head tower 10 can be produced economically and in large numbers by, for example, pressure casting of light metals, for example magnesium or a magnesium alloy. The pivoting positioner furthermore contains a drive motor 11, in this case in the form of rotor 12 provided with permanent magnet plates 13 on the periphery. The rotor 12 is that part of the pivoting support arm 8 which moves directly around the axis 14 of rotation and to which be beam section 9 is rigidly fastened by means of screws 15. The stator of the drive motor is not shown but may simply be in the form of a semicircular element having flat coils on the inner periphery. The entire moving assembly (8, 9, 10) can be pivoted about the axis 14, through a predetermined angular range. The head tower 10 carried head units 7 which, through the rotary movement of the pivoting unit, can be moved over the surface of disks 6 and positioned on tracks, which are not shown. The disks 6 are driven so that they rotate about their central axis 5, for recording/playback of signals. For fastening the head units 7, the head tower 10 comprises at the free front end of the single beam section mounting means 16, which are formed as fork-shaped protrusions having receiving slots 17 for fastening screws 18. As shown in the figure, the slots are arranged, for example, next to one another in pairs, so that a comb-like mounting means 16 ist obtained in the case of a large number of head units 7.

FIG. 1 shows individual heads 3 which are connected to one another by means of screws 18, individual nuts 19 or a common threaded plate 20 and each of which is mounted on a support spring 4 which carries a flange-plate 2 at the other end. A spacer, in this case in the form of sleeve 21, is provided over the screws 18 and between the flange-plates 2 lying one above of the other. The sleeve 21 advantageously consists of plastic material which is preferably elastically deformable; in an advantageous embodiment, a pair of sleeves 21 is produced and the two sleeves are connected to one another, for example via a web 22. The web 22 keeps the sleeves 21 a distance apart in such a way that they fit into the assembly slots 17 on the head tower.

Prior to assembly, the support springs 4 of the head unit 7 can advantageously be secured by means of a holding clamp 4 which can be removed for assembly (cf. FIGS. 1A and 1B).

The individual heads 3 with support spring 4 and flange-plate 2 are commercially available "Winchester" system heads for fixed disk systems. The head unit 7 is thus already preassembled according to the invention, mounting of the said unit in the slots 17 of the head tower being effected in a simple manner merely by tightening the screws 18. When the screws are tightened, the sleeves or spacers 21 become deformed in their height until the flange-plates 2 of the head unit 7 are pressed onto the mounting surfaces of the head tower, or more precisely the upper and lower sides of the comb elements 16 with the fastening slots 17. Finally, a frictional bond is produced between head unit 7 and swinging arm 8. FIG. 2 shows an embodiment in which head units 7 are connected to the swinging arm 8 in this manner. When the fastening slots 17 are arranged axially one above the other, the head units are advantageously mounted from above through the slots which are still free, the lowest head units 7 being installed first. The nature of the comb elements 16 possessing fastening slots 17 makes it possible for any head units 7 or individual heads to be removed in an advantageous manner when the screws 18, which are accessible from the side, are loosened, making it possible to pull the pair of heads 7 out of the slots 17. Such accessibility of the individual heads or pairs of heads is necessary and advantageous, both for replacing defective elements and for changing the types of head. The simple head mounting/dismantling procedure is a precondition for a firm, i.e. non-detachable, connection between pivoting arm 8 and head tower 10. This connection can be realized not only by producing the components as a single piece, as stated above, but also by welding or soldering. Once the connection is produced, pivoting arm 8 and head tower 10 must in any case act as a single element, this being particularly important with regard to the vibration behavior of the moving unit during the positioning operation. The entire moving head arm unit should be very resistant to torsion and insensitive to vibration and should have a very low mass and therefore consist for the most part of, for example, diecast magnesium.

As a result of the novel embodiment of the positioning apparatus, a novel positioning systems for a 5 inch fixed disk drive system possessing about 1000 tracks per side of each disk has an excellent bending moment and outstanding vibration behavior, the extremely advantageous vibration characteristic of the said positioning system being illustrated below.

As can be seen in FIGS. 2A and 2B, the beam section 9 with head tower 10 consists of a rib structure comprising one or more longitudinal ribs and transverse ribs and an edge 23. As shown in FIG. 2A, the ribs are covered above and below, and a center wall gives a structure with box-shaped cavities which can be manufactured in an advantageous manner, pressure casting or injection molding, for example from magnesium, being an economical production method. Advantageously, the arm section 9 with the head tower 10 is manufactured as a single piece or integrally in order to obtain the stiffness and vibration characteristics described below, also in relation to bending coupled with very small mass.

In any case, the rib structure should be such that the minimum bending moments are reached or, more advantageously, exceeded. Any suitable construction, for example a honeycomb structure or a girder structure, can be used for this purpose.

We have found that, in order to be able to achieve sufficiently rapid and reliable positioning at recording densities of 400 tracks/cm or higher, the minimum bending moment $M_b$ acting on the swinging arm 8 (in the direction of arrow B in FIG. 2A), or, more accurately, on the beam section 9 and the head tower 10, when clamped on one side at the transverse axis 14 passing through the shaft, should be 0.15 Nm for a deflection (spring displacement) F of 14 $\mu$m at the free front end of the arm. The deflections were measured using a Tesatast type micrometer from Tesa, Switzerland, which can be read with an accuracy of 0.5 $\mu$m.

The pivoting arm 8 shown diagrammatically in the drawings and described here has a bending moment $M_b$ of 0.66 Nm and, depending on the thickness number and arrangement of the ribs, can have values of $M_b$ of about 0.3–0.8 Nm. With this apparatus, track densities of about 400 tracks/cm and higher can be readily achieved, and the high mechanical strength and stability make it unnecessary to employ very expensive electronic control equipment, e.g. servomotors, in order to achieve high positioning accuracy and reliability coupled with high positioning speed.

A graph of the head arm positioning speed v against the vibrational frequency f is shown in FIG. 3. The figure shows a curve on a logarithmic scale with a very linear descent to about 1.5 kHz, up to the pronounced natural resonance points measured at about $f_R = 1.7$ kHz and 2.25 kHz. At a frequency of f of 50 Hz, the positioning speed v is about −40 dB. The break-through frequency $f_D$, which is determined from the point of intersection of the horizontal through the highest resonance amplitudes with the curve, is 0.9 kHz in the practical example of the fixed memory processing unit described above. Hence, the mechanical vibration behavior of the positioning system is so good that the electronic control equipment, e.g. servomotors, need not be very expensive, i.e. it is not necessary to use notch filters, etc., in order to achieve adequate positioning speed, accuracy and reliability.

The positioning apparatus and a disk memory have been described above, but such a positioning apparatus is of course not restricted to this application. For example, it is possible that, owing to its great stiffness and, where relevant, the advantageous mass distributrion and the excellent mechanical vibration behavoir, the apparatus will be used for record players, magnetic, optical or electrical video recorders, etc. and for industrial robots.

We claim:

1. Apparatus for positioning a plurality of scanning devices over preselected tracks on a stack of at least two rotatable recording disks in a memory processing unit, said apparatus comprising a single cantilevered pivoting assembly common to said plurality of scanning devices and including a tower carrying said plurality of scanning devices, each of said scanning devices being provided at the free end of a likewise cantilevered support spring and said spring at its opposite end terminating in a plate member, and a support arm having a single beam section which at its free end carries said tower and which at its other end, in turn, is carried by a drive section having a rotor element mounted for pivotal movement about an axis parallel to the rotational axis of said disks and located outside the periphery of said disks, and said apparatus also comprising a stator element, said rotor element and said stator element together forming a drive motor for pivoting said assembly;

wherein said tower is integral with the free end of said single beam section and means are provided on said tower for mounting the plate member of said support springs, and said mounting means having receiving slots of a predetermined width and being formed as protrusions defining said slots between them, said protrusions being integral with the free end of said single beam section;

wherein the plate members of two vertically adjacent support springs are a predetermined distance apart, screws being provided to connect said plate members to each other, and the width of said receiving slots in said protrusions corresponding to the spacing and diameter of the screws; and wherein, for adjusting the distance between two adjacent scanning devices sleeves which are elastically deformable are provided over the screws.

2. Apparatus as claimed in claim 1, wherein the sleeves consist of plastics.

3. Apparatus as claimed in claim 1, wherein a common threaded plate forms the counterpiece for the fastening screws.

4. Apparatus as claimed in claim 1, wherein the scanning devices are arranged to be mounted as units one above the other and are connected to one another in pairs.

5. A memory processing unit including at least one apparatus for positioning a plurality of magnetic heads over preselected tracks on a stack of at least two rotatable recording disks, said apparatus comprising a single cantilevered pivoting assembly common to said plurality of magnetic heads and including a tower carrying said plurality of magnetic heads, each of said magnetic heads being provided at the free end of a likewise cantilevered support spring and said spring at its opposite end terminating in a plate member, and a support arm having a single beam section which at its free end carries said tower and which at its other end, in turn, is carried by a drive section having a rotor element mounted for pivotal movement about an axis parallel to the rotational axis of said disks and located outside the periphery of said disks, and said apparatus also comprising a stator element, said rotor element and said stator element together forming a drive motor for pivoting said assembly;

wherein said tower is integral with the free end of said single beam section and means are provided on said tower for mounting the plate member of said support springs, and said mounting means having receiving slots of a predetermined width and being formed as protrusions defining said slots between them, said protrusions being integral with the free end of said single beam section;

wherein the plate members of two vertically adjacent support springs are a predetermined distance apart, screws being provided to connect said plate members to each other, and the width of said receiving slots in said protrusions corresponding to the spacing and diameter of the screws; and wherein, for adjusting the distance between two adjacent magnetic heads elastically deformable sleeves are provided over the screws.

* * * * *